Jan. 8, 1924.
W. A. NELSON
1,480,291
PROCESS FOR OBTAINING NITROGEN FROM THE AIR
Filed July 13, 1923
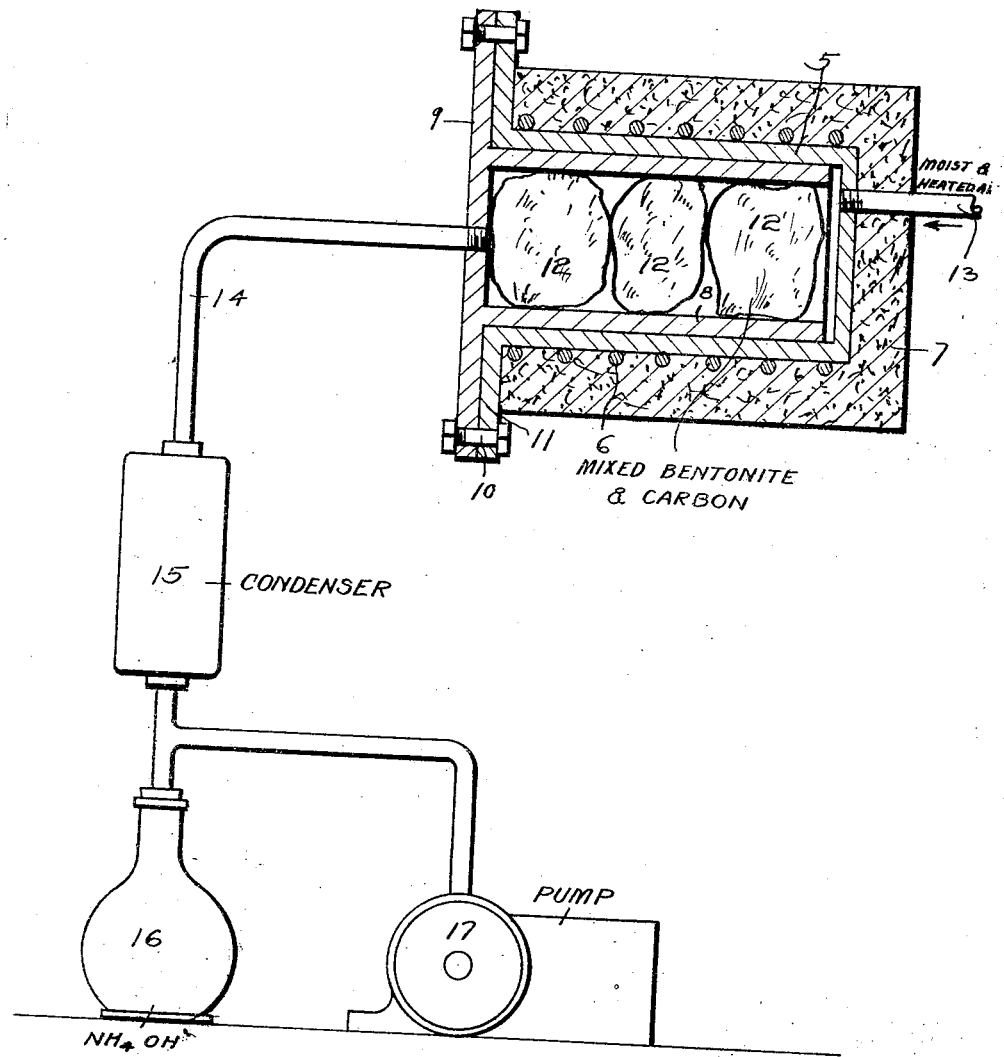

Patented Jan. 8, 1924.

1,480,291

UNITED STATES PATENT OFFICE.

WILBUR ARMISTEAD NELSON, OF NASHVILLE, TENNESSEE.

PROCESS FOR OBTAINING NITROGEN FROM THE AIR.

Application filed July 13, 1923. Serial No. 651,258.

*To all whom it may concern:*

Be it known that I, WILBUR A. NELSON, a citizen of the United States, residing at Nashville, in the county of Davidson and State of Tennessee, have invented certain new and useful Improvements in Processes for Obtaining Nitrogen from the Air, of which the following is a specification, reference being had therein to the accompanying drawings.

This invention relates to a process for obtaining nitrogen from the air in the form of ammonium hydroxide ($NH_4OH$).

This application is a continuation in part of my copending application Serial Number 601,291, filed November 16, 1922, which has matured into Letters Patent No. 1,465,310, August 21, 1923, for a process for obtaining nitrogen from the air. It is essential to the successful operation of the processes constituting the subject matter of both of these applications that moisture be supplied during the working of the process. This moisture may be supplied either by introducing moist air or by employing a bentonitic clay or other moisture-bearing aluminum silicate. The line of division between this application and my copending application aforesaid is that the said copending application has been restricted to that form of the invention wherein the moisture is supplied through the current of air. This application will be devoted to that form of the invention wherein the moisture is supplied through the use of a moisture-bearing aluminum silicate. In addition, the present invention and application defines a wider range of temperatures than those specified in my preceding application, since I have found by experiments that the temperatures actually employed by me range somewhat lower than I disclosed in my said copending application.

This invention contemplates passing a current of air, which may be preheated, through a closed furnace which contains carbon and a complex hydrous aluminum silicate in the form of a clay. Preferably the clay and carbon are intimately mixed before being placed in the furnace. By means of the furnace the carbon and clay are heated to a point above that at which the water of constitution is driven off and to the point where ammonia is formed. I find that temperatures as low as 460° C. yield satisfactory results and I contemplate employing temperatures anywhere between 400° C. and 1200° C.

The air drawn through the furnace and the gases formed in it are then passed through a condenser which condenses the water vapor which has absorbed the ammonia with the result that ammonium hydroxide is delivered from the condenser.

I have practiced the foregoing invention in the following way: A mixture of bentonite and gas carbon reduced to a plastic form by the addition of water was shaped to form balls or a cylindrical roll and in such form was placed in an iron electric furnace and heated to 1000° C. Heated air was drawn through the furnace from the beginning of the heating and until the temperature had reached the maximum point and the gases and air drawn from the furnace were passed through a condenser. The water vapor driven off from the bentonite absorbed the ammonia which formed in appreciable amounts when the temperature reached 460° C. and thereafter and the condensation of these gases resulted in a continuous yield of ammonium hydroxide after the temperature reached approximately 460° C. and up to the point of maximum temperature employed.

In the accompanying drawing, I have diagrammatically illustrated an apparatus by which the invention may be practiced.

In this drawing 5 designates the shell or body of a furnace having an electric heating coil 6 wound externally thereon. This coil and shell are enclosed in a jacket 7 of insulating material. A sleeve 8 fits snugly within the shell and is provided with a cap or head 9 adapted to be secured by screws 10, to a flange 11 of shell 5. The charge of mixed bentonite and carbon is indicated at 12. An inlet pipe 13 delivers air, which is preferably preheated, to the furnace and an outlet pipe 14 conducts this air and the gases generated in the furnace to any suitable type of condenser 15. Preferably this is a conventional water cooled condenser. Any suitable type of receptacle, indicated at 16, may be disposed in position to receive the ammonium hydroxide from the condenser. A suitable suction pipe, indicated at 17, induces a current of the heated air through the apparatus.

The bentonite referred to and which I have found of particular utility in the practice of the invention described, is a clay formed by the altering of a bed of volcanic ash and has as its chief mineral constituent leverrierite. "The mineral leverrierite swells in water and breaks up into a doughy mass. It is distinctly crystalline and in plates. It is soft, sectile and clay-like. It has an index of refraction of β of about 1.57, birefringence of about 0.02, a very small axial angle and is optically negative in character. The acute bisectrix is sensibly normal to the plates. These are the characteristic properties of leverrierite." Quoted from an article by E. S. Larsen and Edgar T. Wherry, entitled, "Leverrierite from Colorado," in volume 7, No. 8, pages 208 to 214 of the Journal of the Washington Academy of Science.

While I prefer to use bentonite it is to be understood that the invention includes within its purview the use of such other clays and carbonaceous materials as may be found suitable for the purpose. For example, I contemplate the use of powdered or granular wood charcoal, powdered or granular coke or flake or amorphous graphite and I also contemplate employing bauxite, ball clay or kaolin or any bentonitic clay or aluminum silicate containing hydroscopic water or water of constitution, which cannot be driven off at less than 200° C.

Having described my invention what I claim is:

1. The herein described process which consists of heating a mass of moisture-bearing clay and carbon, passing a current of air in contact therewith thereby forming ammonia and condensing the water vapor which absorbs the ammonia whereby ammonium hydroxide is recovered.

2. The herein described process which consists of heating a mass of moisture-bearing bentonite and carbon to a temperature between 460° C. and 1200° C. passing a current of air in contact therewith thereby forming ammonia and condensing the water vapor after the water vapor has absorbed the ammonia to thereby recover ammonium hydroxide.

3. The herein described process which consists of passing a current of air in contact with a mass of moisture-bearing aluminum silicate and carbon heated to a temperature where ammonia is formed and condensing the water vapor after it has absorbed the ammonia to thereby recover ammonium hydroxide.

4. The herein described process which consists of heating a mass composed of a bentonitic clay and a carbonaceous material in intimate mixture to approximately 460° C., passing over said mass a current of air and condensing the water vapor to recover ammonium hydroxide.

5. The herein described process which consists of heating a mass of aluminum silicate and carbonaceous material in the presence of moisture and air to a point at which ammonia is formed and condensing the water vapor which has absorbed the ammonia to thereby recover ammonium hydroxide.

6. The herein described process which consists of heating a mass of bentonitic clay and carbonaceous material to a temperature between 460° C. and 1200° C. in the presence of moisture and air whereby ammonia is formed and condensing the water vapor which has absorbed the ammonia to thereby recover ammonium hydroxide.

7. The herein described process which consists of heating a mass of bentonitic clay and a carbonaceous material in the presence of moisture and air to a point at which ammonia is formed and condensing the water vapor which has absorbed the ammonia to thereby recover the ammonium hydroxide.

In testimony whereof I hereunto affix my signature.

WILBUR ARMISTEAD NELSON.